Sept. 20, 1966    J. J. MONAHAN    3,273,690
APPARATUS FOR FEEDING SETS OF PARTS
Filed June 4, 1964    4 Sheets-Sheet 1
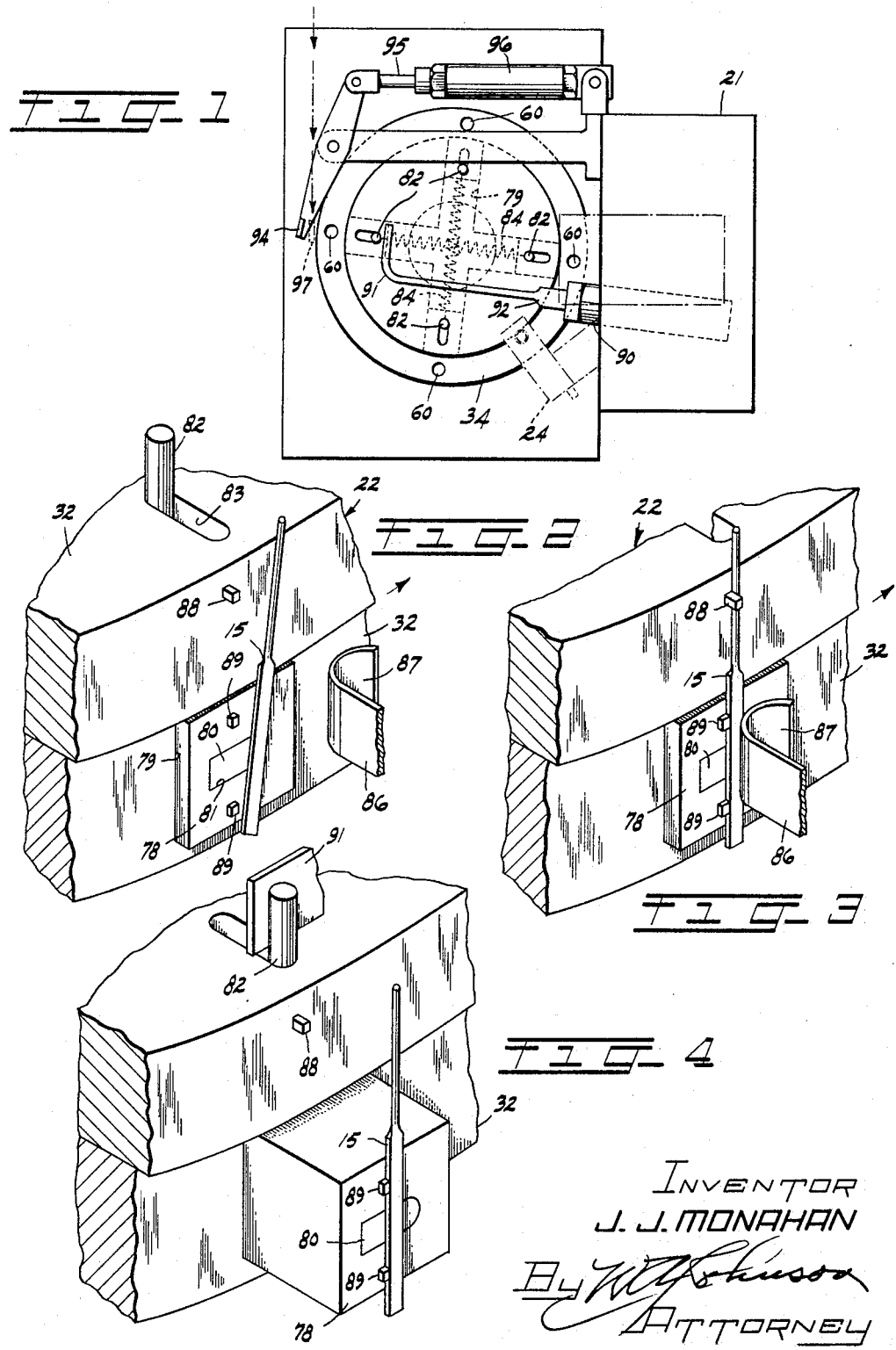
INVENTOR
J. J. MONAHAN
By [signature]
ATTORNEY

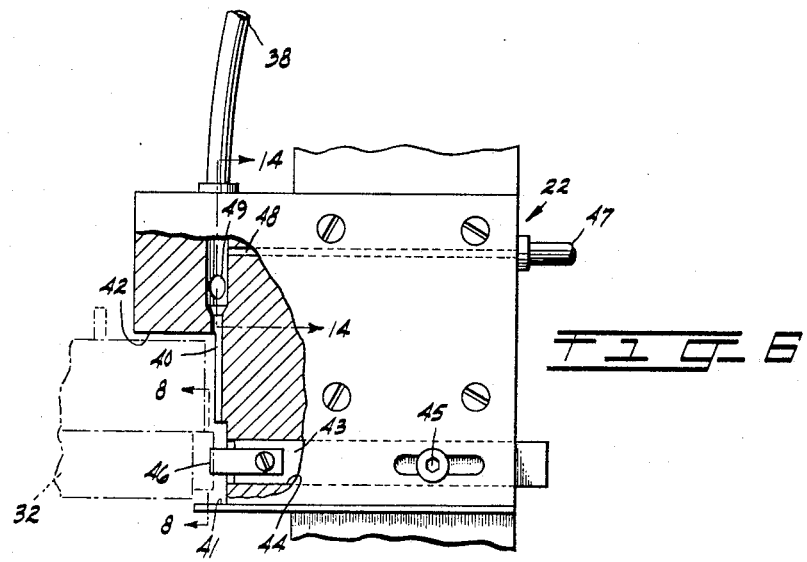
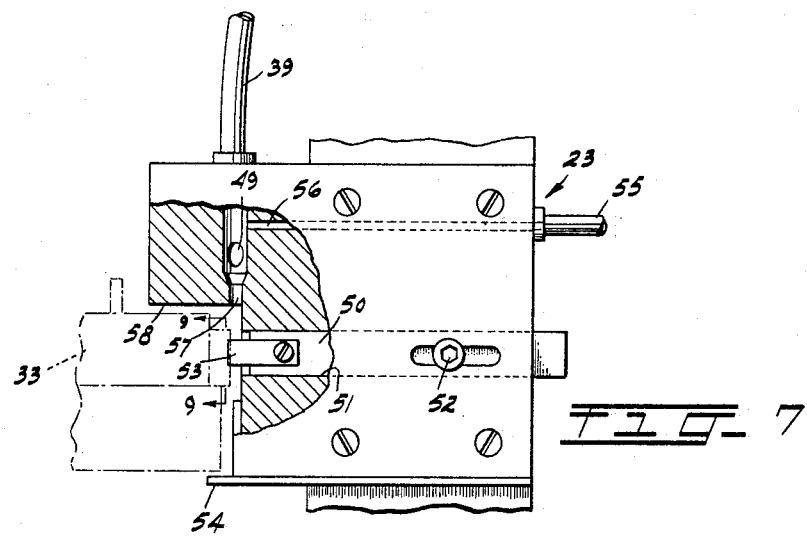
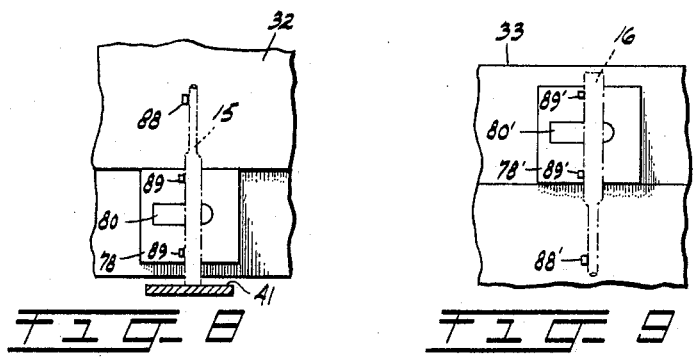

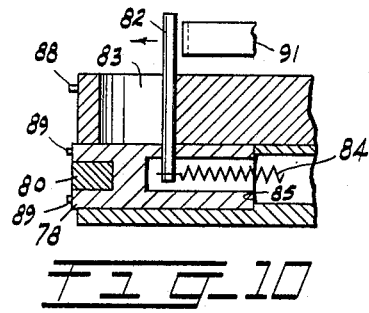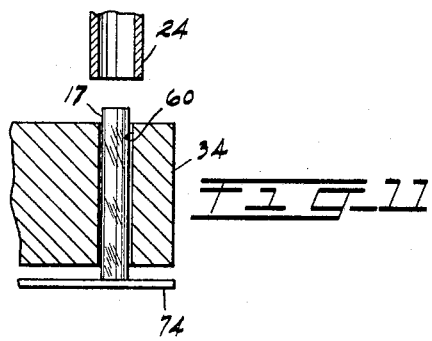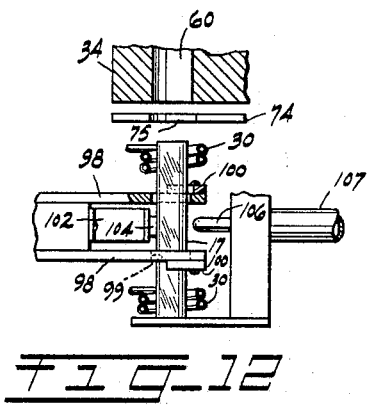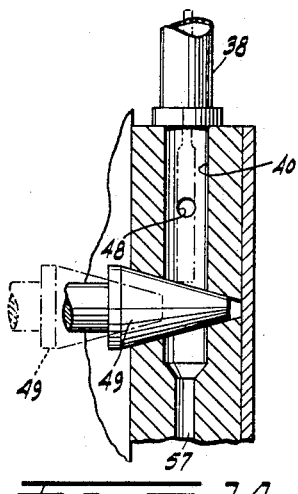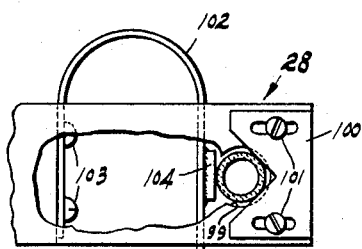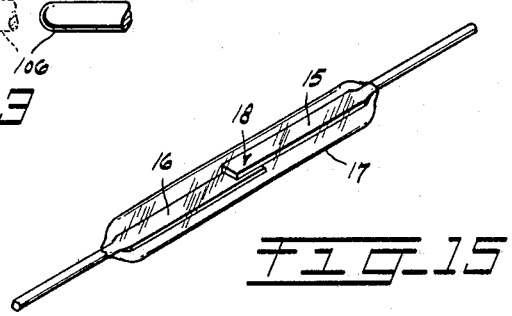

United States Patent Office 3,273,690
Patented Sept. 20, 1966

3,273,690
APPARATUS FOR FEEDING SETS OF PARTS
Jack J. Monahan, Allentown, Pa., assignor to Western Electric Company, Incorporated, New York, N.Y., a corporation of New York
Filed June 4, 1964, Ser. No. 372,618
5 Claims. (Cl. 198—25)

This invention relates to apparatus for feeding sets of parts which are to be assembled into articles, particularly feeding such parts to machines for completing the assembly.

In the present instance, a machine shown in the copending application Serial Number 332,101, filed December 20, 1963, is disclosed for receiving sets of parts, each set including an upper contact, a lower contact and a glass sleeve into which the contacts are to be positioned relative to each other and sealed. This machine has groups of radially positioned holders for the parts in each set.

An object of the present invention is to receive parts of successive sets at supply positions and transfer them to holders therefor of a machine.

In accordance with the object the apparatus for feeding sets of parts to holders of a machine for receiving the parts individually of each set and assemble them into articles includes separate means to feed the parts to supply positions spaced from their respective holders, individual transfer elements for the parts, a support for the transfer elements and means to impart movements to the support to move the transfer element so that they may receive their respective parts at the supply position and transfer them to their respective holders.

Other objects and advantages will be apparent from the following detailed description when considered in conjunction with the accompanying drawings wherein:

FIG. 1 is a top plan view of the apparatus;

FIG. 2 is a fragmentary isometric view of a portion of one of the transfer elements receiving its part;

FIG. 3 is a similar view of the structure shown in FIG. 2 illustrating the function of a positioning member for the part;

FIG. 4 is a similar view of the structure shown in FIG. 2 with the part being moved toward its respective holder;

FIG. 6 is a fragmentary detailed view of the feeding unit for the top contact or part;

FIG. 7 is a fragmentary detailed view of the feeding unit for the bottom contact or part;

FIG. 8 is a vertical sectional view taken along the line 8—8 of FIG. 6;

FIG. 9 is a vertical sectional view taken along the line 9—9 of FIG. 7;

FIG. 10 is a fragmentary sectional view of one of the transfer elements;

FIG. 11 is a fragmentary vertical sectional view of the glass sleeve or intermediate part feeding means at the receiving position;

FIGS. 12 and 13 are fragmentary detailed views of the glass tube or intermediate part feeding means and the holder for this part;

FIG. 14 is a fragmentary detailed view of the means to control feeding of certain of the parts; and FIG. 15 is an isometric view of the assembled article.

*Product of the machine*

Figure 5:
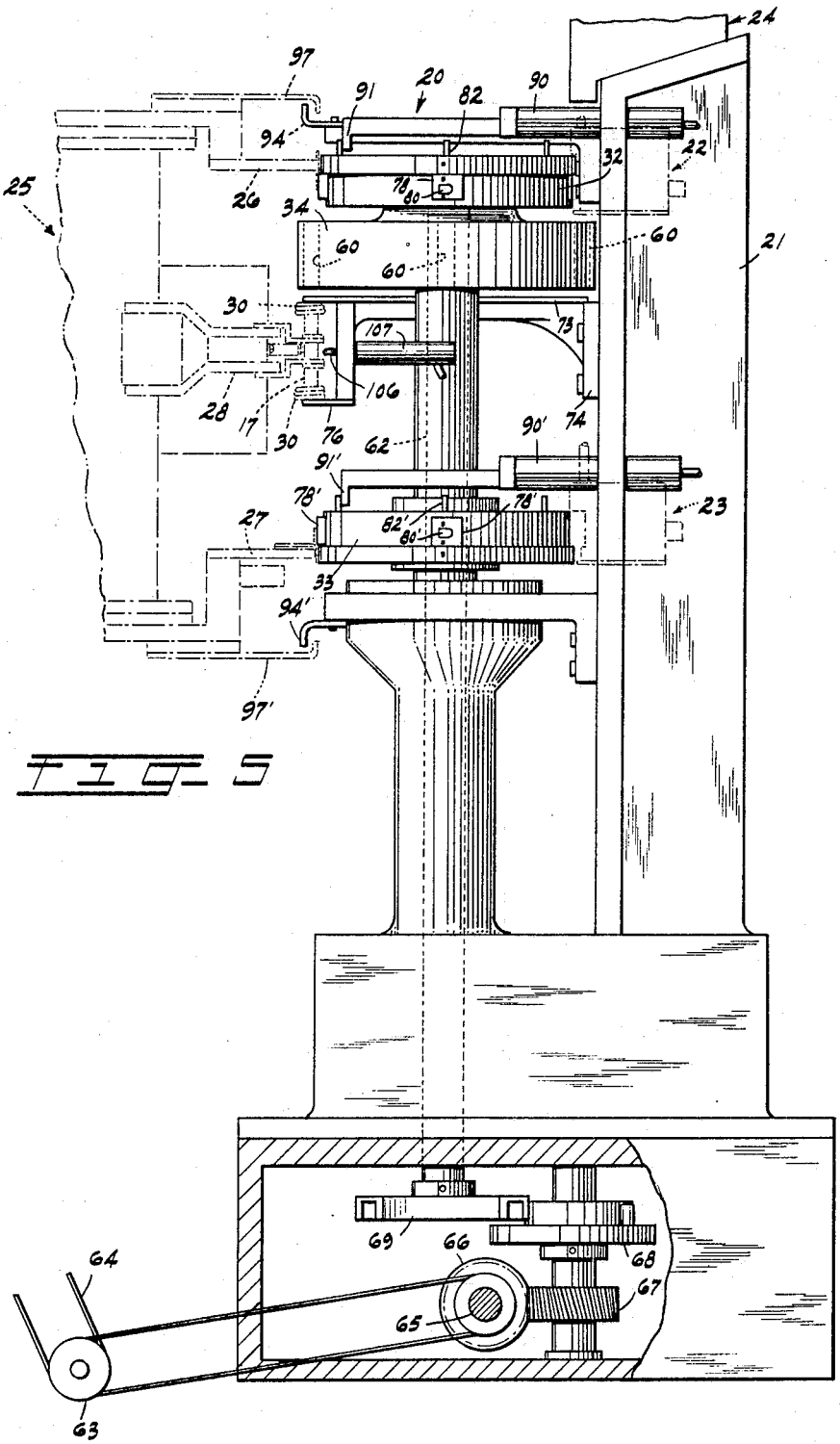
FIG. 5 is a vertical sectional view of the apparatus shown in position between the feeding means for the various parts and the machine for receiving the parts.

The product of the machine, shown in FIG. 13, includes three parts which, in this instance, are identified as a top contact 15, a bottom contact 16, and a glass sleeve 17 which, after the proper positioning of the contacts relative to each other to give a predetermined spaced location to the inner overlapping ends thereof, has its ends sealed about the contacts.

*Apparatus in general*

The apparatus, indicated generally at 20, FIG. 5, is interposed between a support 21 on one side for feeding units 22, 23, and 24 for the top, bottom and intermediate parts 15, 16, and 17 and an assembly machine for the parts indicated generally at 25. The machine has top, bottom and intermediate holders 26, 27, and 28 for the top, bottom and intermediate parts 15, 16, and 17, the top and bottom holders being in the form of gripping jaws to grip and hold their respective top and bottom parts; namely, the top and bottom contacts 15 and 16. The intermediate holder 28 is adapted to receive and grip the glass tube 17 and has heating coils 30 mounted to heat the ends of the glass tube and seal them about their respective parts or contacts 15 and 16. The apparatus in general includes transfer elements 32, 33, and 34 associated with the feeding units 22, 23, and 24, respectively, to receive their respective parts 15, 16, and 17 at the supply positions adjacent the feeding units and transfer them to the holders 26, 27, and 28.

*Apparatus*

The feeders 22 and 23, FIGS. 5, 7, and 8 are substantially identical, the main difference lying in the directions in which the top and bottom contacts 15 and 16 are oriented and advanced successively through tubes 38 and 39, respectively to their feeders. By viewing FIG. 15 it will be noted that the flat portion of the top contact or part 15 is lowermost and is fed to the feeding unit 22 in this manner whereas the flat portion of the bottom contact or part 16 is uppermost and is advanced to its feeding unit 23 in this manner. The feeding unit 22 has a passageway 40 open to the feeding tube 38 where each top contact or part 15 is to enter the feeder 22 and come to rest successively on a stop 41. The feeder 22 is opened at 42 to receive the tranfer element 32. Furthermore, a locating element 43 is disposed in an aperture 44 of the feeding unit 22, adjustable therein through means 45 and provided with spaced fingers 46 to engage the sides of the flat portion of each part or contact 15 to locate it to be received by the transfer element 32. A vacuum line 47, connected through passageway 48 to passageway 40 when active holds the parts 15 against falling to stop 41. An air operated plunger 49 adapted to close the passageway 40 works in conjunction with the vacuum line to control dropping the parts singly.

The bottom feeder 23, that is, the feeder for the bottom contact or part 16 is substantially identical with the feeding unit 22 with exception of the position of the guide 50, adjustable in its aperture 51 through means 52 to position its spaced guide fingers 53 at a higher position from its stop 54 to engage the edges of the flat portion of the bottom contact or part 16 in each instance to locate it with respect to the transfer element 33. A similar vacuum line 55 through a passageway 56 to a main passageway 57 and a cooperating plunger similar to the plunger 49, FIG. 14, for the bottom contacts or parts received from the line 39 will control feeding the parts singly to the stop 54. The feeding unit 23 has a cutaway portion 58 similar to the cutaway portion of the unit 22.

The feeding unit 24, FIGS. 1, 5, and 11, is adapted to feed glass tubes 17 successively to the transfer element 34. The transfer element 34 has four radially positioned apertures 60 therein, and as these apertures move past the feeding unit 24, the glass tubes 17 are fed singly thereto.

The transfer elements 32, 33 and 34 are fixedly mounted on a vertical shaft 62 which is rotated through successive quarter turns. The power means for the shaft 62 originates with a motor 63, which through a belt 64 or other suitable means drives the machine 25. The motor 63 drives a shaft 65 and through gears 66 and 67 a Geneva member 68 is driven. The Geneva member 68 is adapted to impart predetermined driving action to a Geneva driven member 69 supported by the shaft 62 to give intermittent one quarter turns to the shaft 62. As a result of this driving means the apparatus, through the functions of the feeding units 22, 23, and 24, supply their respective transfer elements 32, 33, and 34 with parts of successive sets which are to be transferred in successive order to the holders 26, 27, and 28 of the machine 25 for assembly of the sets of parts into articles.

The transfer elements 32, 33, and 34, are fixed to the shaft 62 and thereby move with the shaft so that after each intermittent movement or one quarter turn of the shaft, a set of parts will be fed to the holders. The glass tubes are supported freely in the apertures 60 of the transfer element 34. A stationary rest 73 is mounted on a bracket 74 fixed to the vertical support 21 and provided with an aperture 75, FIG. 12, disposed in alignment with the holder 28 and the heating coils 30 to allow the successive glass tubes to drop onto a fixed stop 76 and thereby be located for the holder 28, with the ends of the tubes disposed in the heating coils.

The transfer elements 32 and 33 are substantially identical, with the exception of possibly their reverse positions, so that they may act on the flat portions of the parts or contacts 15 and 16. The upper unit 32 has four radially positioned feeders 78 which are movably disposed in radially extending cavities 79 which provide a cross-shaped area as illustrated in FIG. 1. The feeders 78 may be of any suitable nonmagnetic material due to the fact that each has a permanent magnet 80 positioned in a hollow portion 81 thereof and provided with an outer surface which is flush with the outer surface of its respective feeder 78. Each permanent magnet 80 is provided with a pin 82 which extends upwardly through an elongated aperture 83 of the transfer element 32 and is urged inwardly by its respective spring 84. In the present illustration there are two springs 84, FIG. 1, each spring being connected to aligned or diametrically opposed pins 82 to serve in normally urging the feeders 78 with their magnets 80 inwardly against suitable stops 85. The magnet 80 in each feeder 78 draws each part to the feeder as illustrated in FIGS. 2, 3, and 4. An extreme condition is illustrated in FIG. 2 where the top contact or part 15 is not in correct position when received at the feeder 22. However, during the next quarter cycle of the transfer element 32, the part will be moved against an orienting member 86 which is in the form of a leaf-spring with a rounded end portion 87 to be engaged by the part 15 and forced to be located against pins 88 on the upper portion of the transfer element, and pins 89 on the feeder 78 above and below the magnet 80. The part 15 will remain in this position, held by the permanent magnet 80 until after it is fed to the holder 26.

An air cylinder 90 is fixedly mounted on the support 21 and has a bent portion 91 of its piston rod 92 positioned to engage each pin 82 when in the feeding position to force the magnet 80 and the feeder 78 outwardly simultaneously to move the part or top contact 15 into the holder 26. Prior to this movement, a first action of a lever 94, through its connection with a piston rod 95 of an air cylinder 96, is to engage a member 97 adapted to complete opening of the jaws of the holder 26 to receive the part 15. During the second action of the air cylinder the lever 94 is rocked to release the member 97 to allow the jaws of the holder 26 to close on the part 15.

The transfer unit 33 with all of its associated parts and structures has been given prime numbers corresponding to those of the transfer element 32 so that the description of the transfer element 32 may be applied to the transfer element 33. For example, the feeders 78 and the permanent magnets 80 of transfer element 32 are identical with feeders 78' with their permanent magnets 80' of the transfer element 33. Actually, the only difference between the two transfer elements 32 and 33 lies in the fact that the transfer element 33 has a reverse or upside down position compared with the transfer element 32 as illustrated somewhat in FIGS. 5 and 9, this being necessary to receive, orient, and feed the lower contacts 16 to the holder 27 of the machine.

The holder 28, FIGS. 5, 12, and 13, includes parallel arms 98 with aligned apertures 99 to receive the successive parts or tubes 17. V-blocks 100 are adjustably mounted at 101 on the arms adjacent the apertures 99 to serve in positioning each tube 17 to receive the other parts 15 and 16. A spring 102, mounted at 103, has a tube engaging member 104 and a free end 105 which extends outwardly to be engaged by a plunger 106 of an air cylinder 107. The air cylinder 107 is actuated to compress the spring 102 and thereby open each holder 28 to receive each part or tube 17.

*Operation*

The machine 25 is of a turret type structure having a plurality of radially positioned sets of holders 26, 27, and 28 as illustrated in FIG. 5, each set of holders being disposed as shown relative to each other as they move into the supply position. The machine and apparatus are operated through the continuous rotation of the motor 63 to impart intermittent movements to the machine and 90° movements to the shaft 62 and the transfer elements 32, 33, and 34 relative to their feeding units 22, 23, and 24, at one side thereof, and the holders 26, 27, and 28 at the other side thereof. The feeding unit 24 feeds the glass tubes 17 successively, the lowermost glass tube being adapted to ride on the upper surface of the transfer element 34 until an aperture 60 is moved into alignment therewith after which the tubes are advanced by the transfer element 34 until they reach alignment with the heating coils 30 and apertures 99 of the holder 28 of the set of holders in the loading or feeding position. The glass tubes in the aperture 60 have their lower ends supported by the stationary rest 73 until they reach the aperture 75 therein at which time they are free to drop through the coils 30 singly and come to rest on the fixed stop 76. The holder 78 is operated in a suitable manner to receive and hold each glass tube during the subsequent assembly operations of the switch.

The transfer elements 32 and 33 have substantially identical actions in that the feeders 78 and 78' are located at their inner position as they approach their feeding units 22 and 23, respectively. An upper and lower parts 15 and 16 will be ready for the feeders 78 and 78' of the transfer elements 32 and 33 as soon as they are moved into the position shown in FIGS. 7 and 8. Furthermore, the magnets 80 and 80' are positioned to be effective and to draw the parts 15 and 16 into engagement with the outer surfaces of their feeders 78 and 78'. At this time, it may be possible that the parts or contacts 15 and 16 are not located against the pins 88 and 89 of the transfer element 32 or the pins 88' and 89' of the transfer element 33 as illustrated in FIG. 2. During the next rotary movement of the shaft 62 and the transfer elements the parts will engage their respective orienting members 86 and 86' (the latter not being shown) as illustrated in FIG. 3 causing movement of the parts or contacts 15 and 16 against their respective pins as illustrated in FIGS. 9 and 10.

When the feeders 78 and 78' of the transfer elements 32 and 33 move into areas of the holders 26 and 27 of the machine 25, the levers 94 and 94', FIGS. 1 and 5, are operated by their respective air cylinders to complete opening of the jaws of the holders 26 and 27. Immediately following this action the air cylinders 90 and 90', FIG.

5, are actuated to engage the pins 82 and 82' to move their feeders 78 and 78' outwardly as illustrated in FIG. 4 to move the rounded portions of the parts 15 and 16 into the open jaws of the holders 26 and 27. While in this forward position the levers 94 and 94' are again actuated to allow the jaws of the holders 26 and 27 to close firmly gripping their respective parts 15 and 16. Immediately following this action the air cylinders 90 and 90' are actuated allowing the springs associated with the feeders 78 and 78' to move the feeders inwardly to thereby break the magnetic connection with the parts 15 and 16 and return to their starting position.

During the continuous driving action of the motor 63, sets of parts are picked up by the transfer elements, one element for each part, and fed to holders of a machine adapted to receive the parts in their predetermined oriented arrangement and assemble them into an article. The apparatus is completely automatic and operates in synchronism with the machine so that when each set of holders of the machine reaches the loading station it is supplied with a complete set of parts.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for feeding sets of parts to be assembled comprising:
    a rotary work table,
    sets of holders mounted at spaced angular positions on the work table,
    a plurality of rotary transfer devices, one for each of the parts, mounted adjacent the work table on a common axis parallel to the axis of the work table,
    each transfer device having part receiving means located thereon at spaced angular positions,
    means for supplying parts singly to the part receiving means,
    means to drive the work table and the transfer devices in synchronism so that each set of parts is brought into mutual alignment with, and adjacent to, a set of holders, and
    means operable when a set of parts is so aligned to transfer the said set of parts to the aligned set of holders.

2. An apparatus for feeding sets of parts to be assembled comprising:
    a rotary work table,
    sets of holders mounted at spaced angular positions on the work table,
    a plurality of rotary transfer devices, one for each of the parts, mounted adjacent the work table on a common axis parallel to the axis of the work table,
    each transfer device having part receiving means located at spaced angular positions thereon including a magnetic means movable between a part retaining position and a part releasing position,
    means for supplying metallic parts singly to each of the part receiving means,
    means to drive the transfer devices and the work table in synchronism so that each set of parts is brought in line with, and adjacent to, a set of holders, and
    means to operate each slidable means when a set of parts are so aligned to transfer the set of parts from the transfer device to the aligned set of holders.

3. An apparatus according to claim 2, wherein the set of parts include two elongated contacts and a tubular insulating member in which the contacts are to be mounted, comprising:
    a pair of said transfer devices for the electrodes, and
    a rotary transfer device mounted intermediate the said pair of transfer devices, part receiving means mounted at spaced angular positions on the intermediate transfer device for supporting the tubular insulating members, there being three holders in each set, mounted one above the other, so that as a set of parts is so aligned a contact is transferred to an upper holder, a tubular insulating member is transferred to an intermediate holder, and a contact is transferred to a lower holder.

4. An apparatus for feeding sets of metallic parts to sets of holders of a machine for receiving the parts individually and assembling them into articles comprising:
    separate means to feed the parts to supply positions spaced from their respective holders for their parts,
    individual transfer elements for the parts having means to receive and support their respective parts,
    a support for the transfer elements interposed between the supply positions and the holders,
    means to impart movements to the support to move the transfer elements so that they may receive their respective parts at the supply positions and transfer them to their respective holders,
    magnetic members radially positioned about the transfer element for the metallic parts, for receiving the metallic parts successively and transferring the metallic parts to their successive holders,
    feeders for the metallic parts movably supported by the transfer element therefor and movably supporting the magnetic members, and
    means to move the feeders when adjacent the holders to feed the metallic members singly to the holders therefor.

5. An apparatus according to claim 4 comprising:
    means to orient the metallic parts relative to the magnetic members to position them for transfer to the holders.

References Cited by the Examiner
UNITED STATES PATENTS

| 2,984,046 | 5/1961 | Brewer et al. | 65—276 X |
| 3,136,028 | 6/1964 | Humen | 198—41 X |
| 3,164,081 | 1/1965 | Vincze | 198—41 X |
| 3,187,418 | 6/1965 | Kent | 29—203 |
| 3,200,471 | 8/1965 | Johnson et al. | 29—203 X |

EVON C. BLUNK, *Primary Examiner.*

R. J. HICKEY, *Assistant Examiner.*